3,019,086
PREPARATION OF DIBORANE

Earl L. Muetterties, Chadds Ford, Pa., assignor to E. I. du Pont de Nemours and Company, Wilmington, Del., a corporation of Delaware
No Drawing. Filed Apr. 1, 1957, Ser. No. 649,641
5 Claims. (Cl. 23—204)

This invention relates to boron hydrides and more particularly to a new and improved method for making diborane.

Diborane, a basic chemical in boron chemistry, is useful in a wide variety of applications. Almost every boron compound of importance can be directly obtained from it. Diborane can be pyrolyzed under controlled conditions to form boron or boride coatings on metals or ceramics. It is also useful as a high energy fuel.

Several methods for preparing diborane and other boron hydrides have been disclosed heretofore. However, these older methods possess certain deficiencies. Some, for example, give poor yields of diborane, and others require the use of expensive or relatively unavailable starting materials. Recently several new methods of making diborane have been proposed which use more readily available starting materials.

In view of the potential importance of diborane and the above-mentioned deficiencies of the older preparative methods, this invention has as an object a more economical preparation of diborane and one more suitable for use in large scale manufacture of diborane. A further object is provision of a novel method for preparing diborane from the lowest cost and most readily available boron compounds that are known. Still another object is provision of a novel method for preparing essentially pur diborane directly. Other objects will appear hereinafter.

These objects are accomplished in accordance with the present invention by a process which comprises reacting boric oxide with hydrogen at a temperature of at least 800° C. in the presence of an electropositive metal of atomic number 11–26, i.e., sodium, magnesium, aluminum, potassium, calcium or iron, followed by cooling the reaction mixture to a temperature below about 300° C. in less than one minute.

It will be understood that any compound which decomposes to boric oxide under the aforementioned reaction conditions can be used in place of boric oxide. For example, the metal borates decompose to boric oxide under the reaction conditions, thus serving as an in situ source of boric oxide. The borates of the alkali metals and alkaline earth metals are particularly well suited for use in the process of this invention. Specific borates that can be employed include lithium, sodium, potassium, calcium, magnesium, and barium metaborate, and sodium and potassium tetraborate.

Aluminum is the preferred electropositive metal employed in the process of this invention.

The process is conveniently carried out in a corrosion-resistant reaction vessel fitted with means for introducing hydrogen continually during the reaction, means for heating the reaction mixture to the desired temperature and means for rapidly quenching the reaction gases. The reaction vessel is charged with boric oxide or a metal borate and an amount of aluminum at least stoichiometrically equivalent to the boron compound. For reactions carried out at temperatures above the boiling point of the metal, for example with sodium, the metal may be introduced as a vapor. An excess of aluminum or other electropositive metal is preferably employed, ratios of aluminum to boron compound ranging up to 5:1 being operable.

The free space in the reaction vessel is swept out with hydrogen and the reaction vessel is then heated to a temperature of at least 800° C., preferably to between 1000–3000° C. by external means, e.g., by an induction furnace. Hydrogen is passed through the vessel continually during the heating so that at least 3 moles of hydrogen for each mole of boric oxide or an equivalent amount of metal borate is used. Excess hydrogen is desirable as a carrier gas, and after quenching and separation from the diborane the excess hydrogen can be recycled to the reactor. The effluent gases from the reaction vessel are passed directly into a trap cooled to low temperature, e.g., through a trap cooled by liquid nitrogen, where condensable gaseous reaction products are isolated. The hydrogen is passed through the reaction vessel at such a rate that the gaseous reaction products are kept at the reaction temperature of more than 800° C. for a period of less than one minute.

The gases are cooled from the reaction temperature to a temperature below about 300° C. in less than one minute and preferably in less than 30 seconds. Rapid quenching of the reaction gases is important in the process of this invention in order to obtain best yields of diborane, since diborane decomposes rapidly at temperatures of 300° C. and higher.

The pressure at which the reaction is carried out is not critical. Atmospheric pressure is convenient and is generally employed. However, elevated or reduced pressures can be used provided means are employed for rapidly quenching the reaction products to temperatures below 300° C. in the times specified above.

The composition of the condensable gases isolated in the cold trap can readily be determined by means of the mass spectrometer. The diborane can be isolated by fractional distillation.

A modification of the process described above which can be employed if desired involves adding to the mixture of boric oxide or metal borate and the electropositive metal a small amount, e.g., up to 20 mole percent (based on the amount of boron compound used) of an easily reducible oxide, e.g., ferric oxide, nickel oxide, or mercuric oxide. These easily reducible oxides have a beneficial effect in that they help sustain the spontaneous reduction of the boron-oxygen bond by the metals. In carrying out this embodiment of the process a mixture of boron oxide, or metal borate, electropositive metal, e.g., aluminum, and 5–15 mole percent of ferric oxide is placed in a reaction vessel. The free space in the reaction vessel is swept out with hydrogen. While hydrogen is passed through the reaction vessel at a rate such that reaction products are swept out of the vessel into a trap cooled by liquid nitrogen in a period of less than one minute, the temperature of a part of the reaction mixture is raised to above 1000° C. by passing an electric current through a tungsten filament immersed in the reaction mixture. This causes an exothermic reaction to take place, and, after the reaction subsides, the flow of hydrogen is discontinued and the diborane is collected in the cold trap.

The reactants used in the process of this invention do not need special purification with the exception of the hydrogen which should be oxygen-free. The grades of boric oxide, metal borates, and electropositive metal, commercially available are satisfactory for use. The particle size of the electropositive metal used in the process is not critical. However, it is preferred to use metal particles having as large a surface area as practical since this permits more uniform mixing of the reaction mixture and produces more efficient operation.

The following examples illustrate the process of this invention in greater detail.

Example 1

A 12-liter, round bottom reaction vessel made of the corrosion-resistant alloy known commercially as "Hastelloy" C, having a round bottom and three openings on the top is charged with a mixture of 60 g. of boric oxide, 100 g. of aluminum dust, and 10 g. of ferric oxide. Through the center opening of the vessel there is inserted a sight glass through which passes two electrical leads which are connected by a fine tungsten filament at the lower end, and this tungsten filament is adjusted to such a height that it rests in the charge of boric oxide and aluminum. Oxygen-free hydrogen is passed at a rate of approximately 10 liters per minute through one opening of the vessel and the exit gases coming out of the third opening are passed directly into a trap cooled by liquid nitrogen. When the reaction vessel is thoroughly purged with hydrogen, a current of 15 volts and 25 amperes is passed through the tungsten filament for a period of 5 minutes. This produces a temperature of more than 1000° C. and is sufficient to initiate an exothermic reaction in the mixture of boric oxide, aluminum, and ferric oxide. After the reaction subsides, which occurs in about 3 minutes, approximately 0.6 g. of condensed reaction product is recovered from the cold trap. Mass spectrographic analysis shows that diborane is the only constituent of this gas.

Example 2

The reaction vessel consists of an alumina tube (99.7% $Al_2O_3$), 19 mm. inside diameter and 26 inches long placed in an electric combustion tube furnace. It is fitted with a glass inlet tube for introduction of hydrogen and a glass exit tube to conduct the reaction gases through a trap cooled by ice and then through a burner consisting of a quartz tube drawn down to a tip of about 1 mm. diameter. The tip is surrounded by a smoked aluminum shield open at the front to aid in observing the flame.

An alumina boat is charged with 2.58 g. of a mixture prepared by grinding 7.0 g. of boric oxide with 5.5 g. of aluminum dust in a mortar, and the boat is placed in the reaction tube near the middle of the electric furnace. The tube is flushed with nitrogen, and then with hydrogen which has been dried by passing through a tower filled with the desiccant known commercially as "Drierite" and then through silica gel. Hydrogen is passed through the tube at a rate of 5.7 liters (at 25° C. and 760 mm.) per hour, and the electric furnace is turned on. When the exit gas is found, by separate tests of samples collected in a test tube, to burn smoothly when ignited, the burner on the exit tube is ignited. In 1.5 hours after the heating is begun, the temperature of the reaction mixtures reaches 960° C. and the exit flame burns with a pale green color. In about 20 minutes more the temperature reaches 1025° C. and the exit flame burns with a strong green flame. The exit gases are then passed into a trap cooled by liquid nitrogen and finally through the burner. In about another 1.25 hours the reaction temperature reaches 1175° C. and the exit gases from the nitrogen trap burn with a very pale green flame.

The trap containing the reaction products is removed from the liquid nitrogen bath, its temperature is raised to −78° C., and the exit gases from the trap are passed through the burner. These exit gases burn with a very strong green flame and the unlighted gases from the trap turn moist, blue litmus to a red color. This indicates that the product volatile at −78° C. is diborane.

The examples have illustrated the process of this invention by reaction of boric oxide with hydrogen in the presence of aluminum. While aluminum is a preferred electropositive metal, other electropositive metals of atomic number 11–26 can also be employed. Thus, sodium, magnesium, potassium, calcium and iron can also be employed.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A process of preparing diborane which comprises the steps of reacting boric oxide with hydrogen at a temperature of at least 800° C. in the presence of an electropositive metal selected from the group consisting of sodium, magnesium, aluminum, potassium, calcium and iron, and then cooling the gaseous reaction mixture to a temperature below about 300° C. in less than one minute.

2. Process of claim 1 wherein a metal borate is used as an in situ source of boric oxide.

3. Process of claim 1 wherein said electropositive metal is aluminum.

4. Process of claim 1 wherein the reaction between the boron compound and hydrogen is carried out in the presence of said electropositive metal and an oxide of the group consisting of ferric oxide, nickel oxide and mercuric oxide, said oxide being present in an amount up to 20 mole percent based on amount of boron compound used.

5. A method for preparing diborane which comprises reacting boric oxide, in the presence of aluminum, in a molar ratio ranging from 1 to 5 gram atoms of aluminum to one gram atom of boron, with hydrogen at a temperature of 1000–3000° C., and then quenching the resulting gaseous reaction mixture to a temperature below about 300° C. in less than 30 seconds.

References Cited in the file of this patent

UNITED STATES PATENTS

| | | |
|---|---|---|
| 2,864,671 | Mohlman | Dec. 16, 1958 |
| 2,875,028 | Uinternitz | Feb. 24, 1959 |

OTHER REFERENCES

Koster et al.: "Angewandte Chemie," vol. 69, pp. 94–95, Feb. 7, 1957.

Laubenfayer et al.: "Journal of Chemical Education," vol. 19, pp. 382–385 (1942).

Hurd: "Chemistry of the Hydrides," 1952, pages 64–65.

Taylor: "Inorganic and Theoretical Chemistry," 9th edition, 1952, pages 148–149.

Jones: "Inorganic Chemistry," 1947, page 576.

Hurd: "Journal of the American Chemical Society," vol. 71, pages 20–22 (Jan. 1949).